(12) United States Patent
Kim

(10) Patent No.: US 11,614,600 B2
(45) Date of Patent: Mar. 28, 2023

(54) OPTICAL LENS ASSEMBLY INCLUDING SEVEN LENSES OF -+++-+ REFRACTIVE POWERS, AND ELECTRONIC DEVICE COMPRISING SAME

(71) Applicant: Samsung Electronics Co., Ltd., Gyeonggi-do (KR)

(72) Inventor: Dongwoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 222 days.

(21) Appl. No.: 16/765,286

(22) PCT Filed: Dec. 4, 2018

(86) PCT No.: PCT/KR2018/015247
§ 371 (c)(1),
(2) Date: May 19, 2020

(87) PCT Pub. No.: WO2019/132283
PCT Pub. Date: Jul. 4, 2019

(65) Prior Publication Data
US 2020/0310083 A1    Oct. 1, 2020

(30) Foreign Application Priority Data
Dec. 29, 2017  (KR) .......................... 10-2017-0184809

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 7,589,907 B2 | 9/2009 | Yamamoto |
| 8,385,008 B2 | 2/2013 | Hsieh et al. |

(Continued)

FOREIGN PATENT DOCUMENTS

| CN | 102645728 A | 8/2012 |
| CN | 106199922 A | 12/2016 |

(Continued)

OTHER PUBLICATIONS

Chinese Search Report dated Nov. 22, 2021.
International Search Report; dated Mar. 22, 2019.
Korean Office Action dated Oct. 21, 2022.

*Primary Examiner* — Wen Huang
(74) *Attorney, Agent, or Firm* — Cha & Reiter, LLC

(57) ABSTRACT

Disclosed are an optical lens assembly and an electronic device including the same.
The disclosed optical lens assembly may include a first lens, a second lens, a third lens, a fourth lens, a fifth lens, a sixth lens, and a seventh lens arranged from an object side to an image side, the first lens may have a negative refractive power, an object side surface or an image side surface of the seventh lens may include an aspherical shape that is convex toward the object side in a region near an optical axis and is concave toward the object side in a peripheral region, and the optical lens assembly may have a field of view ranging from 120° to 200°.

9 Claims, 11 Drawing Sheets

(56) References Cited

U.S. PATENT DOCUMENTS

| | | |
|---|---|---|
| 8,643,958 B2 | 2/2014 | Abe et al. |
| 10,564,395 B2 | 2/2020 | Jia et al. |
| 11,181,718 B2 | 11/2021 | Dai et al. |
| 2016/0223790 A1 | 8/2016 | Liao et al. |
| 2016/0377839 A1 | 12/2016 | Chen et al. |
| 2017/0336600 A1 | 11/2017 | Segawa et al. |
| 2019/0187442 A1* | 6/2019 | Jia .......................... G02B 13/04 |
| 2022/0283406 A1 | 9/2022 | Lee |

FOREIGN PATENT DOCUMENTS

| | | |
|---|---|---|
| CN | 106772941 A | 5/2017 |
| CN | 107065141 A | 8/2017 |
| JP | 2009-025801 A | 2/2009 |
| JP | 2014-102291 A | 6/2014 |
| JP | 2016-194653 A | 11/2016 |
| KR | 10-1089938 B1 | 12/2011 |
| KR | 10-2017-0045556 A | 4/2017 |

\* cited by examiner

OPTICAL LENS ASSEMBLY INCLUDING SEVEN LENSES OF -+++-+ REFRACTIVE POWERS, AND ELECTRONIC DEVICE COMPRISING SAME

CROSS REFERENCE TO RELATED APPLICATIONS

This application is a National Phase Entry of PCT International Application No. PCT/KR2018/015247, which was filed on Dec. 4, 2018, and claims a priority to Korean Patent Application No. 10-2017-0184809, which was filed on Dec. 29, 2017, the contents of which are incorporated herein by reference.

TECHNICAL FIELD

Various embodiments relate to an optical lens assembly and an electronic device including the same, and more particularly, to a small optical lens assembly having an ultra-wide field of view, and an electronic device including the same.

BACKGROUND ART

The various services and additional functions provided by electronic devices are gradually expanding. Electronic devices, e.g., mobile devices or user devices, may provide various services by using various sensor modules. Electronic devices may provide a multimedia service, e.g., a photo service or a video service. The increase in the use of electronic devices has led to the increase in the use of cameras functionally connected to electronic devices. In accordance with such user demand, the camera performance and/or resolution of electronic devices are being improved. Various types of landscape, portrait, and selfie photos may be taken using the cameras of electronic devices. Such multimedia, e.g., photos or videos, may be shared on social networking sites or other media.

Due to the development of semiconductor and display technologies, various lenses for cameras of mobile devices are being developed from low resolution to high resolution, from a small sensor format to a larger sensor format, e.g., from ⅛" to ½", and from a telephoto lens to an ultra-wide-angle lens.

An ultra-wide-angle lens or a fisheye lens has a small maximum field of view of less than 130°, or causes serious quality deterioration in a peripheral portion of an image when it has a maximum field of view equal to or greater than 130°. In addition, aberration control and reduction in size may not be easily achieved in implementing a maximum field of view equal to or greater than 130° and a large diameter.

DESCRIPTION OF EMBODIMENTS

Technical Problem

Currently, ultra-wide-angle or omnidirectional cameras are being actively developed. Although an ultra-wide-angle fisheye lens optical system requires high image quality and a very small size appropriate for mobile devices, according to conventional technology, a very small size may not be easily achieved due to the use of a glass lens or, even when implemented with a very small size, high-quality images may not be easily captured due to aberration.

Various embodiments may provide, for example, an ultra-wide-angle small optical lens assembly in an electronic device (e.g., a mobile device).

Furthermore, various embodiments may provide, for example, an electronic device including the ultra-wide-angle optical lens assembly.

In addition, various embodiments may provide an electronic device capable of capturing omnidirectional images by including a plurality of ultra-wide-angle optical lens assemblies.

Solution to Problem

An optical lens assembly according to an embodiment may include a first lens, a second lens, a third lens, a fourth lens, a fifth lens, a sixth lens, and a seventh lens arranged from an object side to an image side, the first lens may have a negative refractive power, an object side surface or an image side surface of the seventh lens may include an aspherical shape that is convex toward the object side in a region near an optical axis and is concave toward the object side in a peripheral region, and the following inequalities may be satisfied.

<Inequalities>

$$120° \leq Fov \leq 200°$$

$$2.5 \leq TL/\mathrm{ImgH} \leq 5$$

where Fov denotes a field of view of the optical lens assembly, TL denotes a distance from an object side surface of the first lens to an image plane on which an image is formed by the optical lens assembly, and ImgH denotes an image height.

An optical lens assembly according to another embodiment may include a first lens, a second lens, a third lens, a fourth lens, a fifth lens, a sixth lens, and a seventh lens arranged from an object side to an image side, the first lens may have a negative refractive power and has a flat object side surface, an object side surface or an image side surface of the seventh lens may include an aspherical shape that is convex toward the object side in a region near an optical axis and is concave toward the object side in a peripheral region, and the following inequality may be satisfied.

<Inequality>

$$120° \leq Fov \leq 200°$$

where Fov denotes a field of view of the optical lens assembly.

The optical lens assembly may satisfy the following inequality.

<Inequality>

$$2.5 \leq TL/\mathrm{ImgH} \leq 5$$

where TL denotes a distance from the object side surface of the first lens to an image plane on which an image is formed by the optical lens assembly, and ImgH denotes an image height.

An electronic device according to an embodiment may include at least one optical lens assembly, and at least one image sensor for receiving an image formed by the at least one optical lens assembly, the at least one optical lens assembly may include a first lens, a second lens, a third lens, a fourth lens, a fifth lens, a sixth lens, and a seventh lens arranged from an object side to an image side, the first lens may have a negative refractive power, an object side surface or an image side surface of the seventh lens may include an aspherical shape that is convex toward the object side in a region near an optical axis and is concave toward the object side in a peripheral region, and the following inequalities may be satisfied.

<Inequalities>

$$120° \leq Fov \leq 200°$$

$$2.5 \leq TL/ImgH \leq 5$$

where Fov denotes a field of view of the optical lens assembly, TL denotes a distance from an object side surface of the first lens to an image plane on which an image is formed by the optical lens assembly, and ImgH denotes an image height.

Advantageous Effects of Disclosure

An optical lens assembly according to various embodiments may provide an ultra-wide-angle lens system or a fisheye lens system having a field of view ranging from 120° to 200°. The optical lens assembly according to various embodiments may have a small size and capture ultra-wide-angle images by configuring five or more lenses as plastic aspherical lenses. In addition, due to the use of five or more plastic lenses, manufacturing costs may be reduced and a weight of the whole lens assembly may also be reduced.

MODE OF DISCLOSURE

Figure 1:
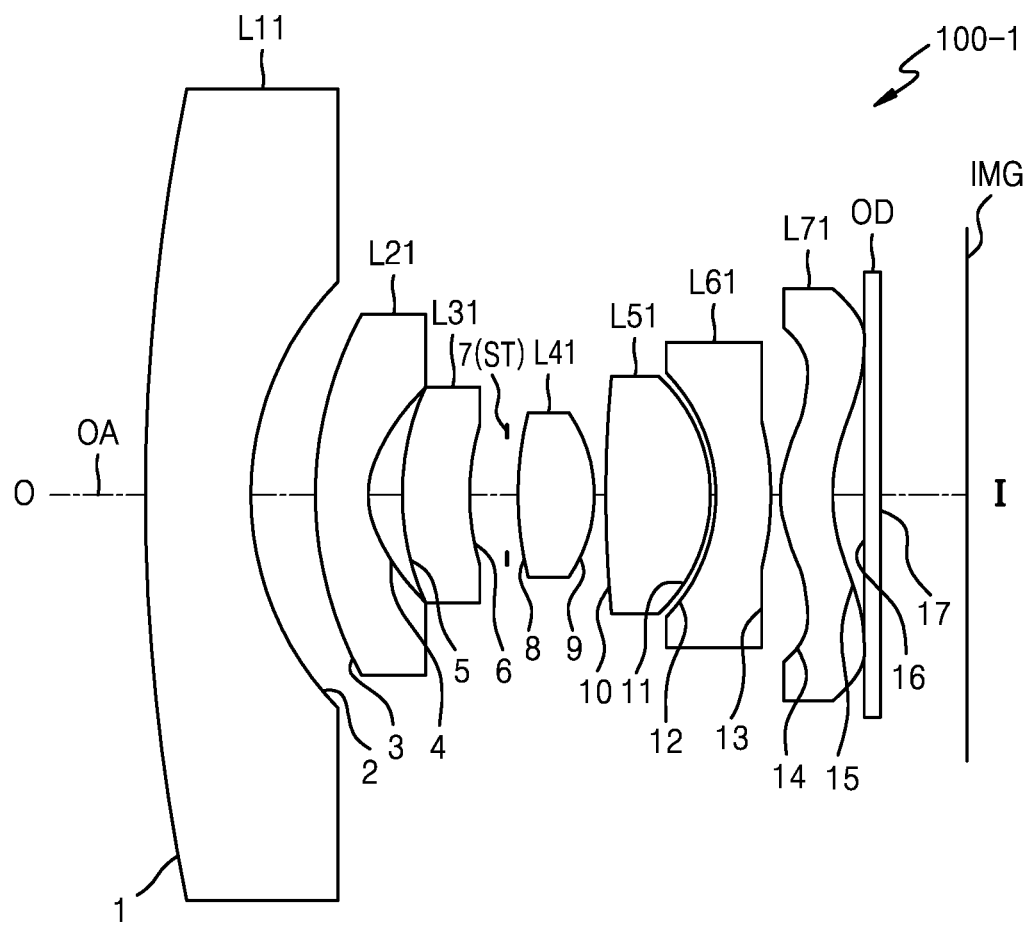
FIG. 1 illustrates an optical lens assembly of Numerical Embodiment 1, according to various embodiments.

Hereinafter, various embodiments of the present disclosure will be described with reference to the attached drawings. An electronic device according to various embodiments of the disclosure may include various types of devices. The electronic device may include, for example, at least one of portable communication devices (e.g., smartphones), computer devices, portable multimedia devices, portable medical devices, cameras, wearable devices, or home appliances. The electronic device according to an embodiment of the disclosure is not limited to the above-mentioned devices.

It should be understood that various embodiments of the disclosure and terms used therein are not intended to limit technical features set forth herein to particular embodiments and include various changes, equivalents, and/or alternatives of a corresponding embodiment. In the drawings, like reference numerals may denote like elements. Singular forms are intended to include plural forms as well, unless the context clearly indicates otherwise. As used herein, expressions such as "A or B", "at least one of A and/or B", "A, B or C", or "at least one of A, B and/or C" may include all available combinations of the listed items. The expressions such as "first", "second", "$1^{st}$" and "$2^{nd}$" used herein may refer to various different elements irrespective of the order and/or priority thereof, and are merely used to distinguish one element from another without limiting the elements. It will be understood that, when an element (e.g., a first element) is referred to as being "(operatively or communicatively) coupled to" or "connected to" another element (e.g., a second element), the element can be coupled or connected to the other element directly or through another element (e.g., a third element).

As used herein, the term "module" may include a unit configured as hardware, software, or firmware, and may be used interchangeably with, for example, the term "logic," "logic block," "component," or "circuit". A module may be a single integral component, a minimum unit for performing one or more functions, or a part thereof. For example, the module may be configured as an application-specific integrated circuit (ASIC).

Various embodiments of the disclosure may be implemented by software (e.g., a program 240) including instructions stored in a machine-readable (e.g., computer-readable) storage medium (e.g., an embedded memory 236 or an external memory 238). The machine is a device capable of retrieving the instructions from the storage medium and operating according to the retrieved instructions, and may include an electronic device according to embodiments of the disclosure (e.g., an electronic device 201). When the instructions are executed by a processor (e.g., a processor 220), functions corresponding to the instructions may be performed directly by the processor, or by using other elements under the control of the processor. The instructions may include codes created or executed by a compiler or an interpreter. The machine-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). For online distribution, at least a part of the computer program product may be at least temporarily stored in the storage medium such as a server of a manufacturer, a server of the application store, or a storage medium (e.g., memory) of a relay server, or be temporarily created.

Each of elements (e.g., modules or programs) according to various embodiments may be configured as one or more entities, and some of a plurality of sub elements may be omitted or other sub elements may be added to various embodiments. Alternatively or additionally, some elements (e.g., modules or programs) may be integrated into a single entity and the integrated entity may equally or similarly perform functions of the elements before being integrated. According to various embodiments, operations performed by modules, programs, or other elements may be carried out sequentially, in parallel, repeatedly, or heuristically, at least some of the operations may be performed in a different order or be omitted, or other operations may be added.

An optical lens assembly according to various embodiments, and an electronic device including the same will now be described with reference to the attached drawings. As used herein, the term "user" may refer to a person who uses an electronic device, or a device that uses the electronic device (e.g., an artificial intelligence (AI) device).

FIG. 1 illustrates an optical lens assembly 100-1 of Numerical Embodiment 1, according to various embodiments.

The optical lens assembly 100-1 according to various embodiments may include a first lens L11 located at the most object side O and having a negative refractive power, and have a field of view ranging from 120° to 200°.

In the following description of each lens, an image side I may refer to, for example, a direction toward an image plane IMG on which an image is formed, and the object side O may refer to a direction toward an object. In addition, an "object side surface" of a lens may refer to, for example, a lens surface facing the object along an optical axis OA, e.g., a left surface in the drawings or a light incident surface, and an "image side surface" of the lens may refer to, for example, a lens surface facing the image plane along the optical axis OA, e.g., a right surface in the drawings or a light exit surface. The image plane IMG may be, for example, the surface of an imaging device or the surface of an image sensor. The image sensor may include, for example, a complementary metal-oxide semiconductor (CMOS) sensor or a charge-coupled device (CCD) sensor. The image sensor is not limited thereto and may be, for example, a device for converting an image of an object into an electrical image signal.

A second lens L21 having a negative refractive power, a third lens L31 having a positive refractive power, a fourth lens L41 having a positive refractive power, a fifth lens L51 having a positive refractive power, a sixth lens L61 having a negative refractive power, and a seventh lens L61 having a positive refractive power may be arranged at the image side I of the first lens L11.

The first lens L11 may include a convex object side surface 1. The first lens L11 may have a meniscus shape convex toward the object side O. The first lens L21 may be, for example, a glass lens. The first lens L11 may be made of glass capable of being tempered, to reduce scratches or damages due to external impact.

The second lens L21 may include a convex object side surface 3. The second lens L21 may have a meniscus shape convex toward the object side O. The third lens L31 may include a convex object side surface 5. The third lens L31 may have a meniscus shape convex toward the object side O. The third lens L31 may correct astigmatism and spherical aberration of the optical lens assembly.

The fourth lens L41 may be, for example, a biconvex lens. The fourth lens L41 may easily correct spherical aberration, and reduce sizes of subsequent lenses.

The fifth lens L51 may include a convex image side surface. For example, the fifth lens L51 may be a biconvex lens. The sixth lens L61 may include a concave object side surface. For example, the sixth lens L61 may have a meniscus shape. A reduction in size of the sixth lens L61 may suppress an increase in astigmatism.

For example, the sixth lens L61 may have at least one inflection point on an image side surface thereof. The inflection point may refer to, for example, a point where the sign of a radius of curvature changes from (+) to (−) or from (−) to (+). Alternatively, the inflection point may refer to, for example, a point where the shape of a lens changes from convex to concave or from concave to convex. The radius of curvature may refer to, for example, a value indicating a degree of curvature at each point of a curved surface or line.

The seventh lens L71 may have at least one inflection point on at least one of an object side surface and an image side surface thereof. For example, the object side surface or the image side surface of the seventh lens L71 may include an aspherical shape that is convex toward the object side in a region near the optical axis and is concave toward the object side in a lens peripheral region. FIG. 1 illustrates an example in which the object side surface of the seventh lens L71 includes an aspherical shape that is convex toward the object side in the region near the optical axis and is concave toward the object side in the lens peripheral region. For example, the image side surface of the seventh lens L71 may include an aspherical shape that is concave toward the image side in the region near the optical axis and is convex toward the image side in the lens peripheral region. The region near the optical axis may refer to a region in a predetermined radius range from the optical axis OA. The seventh lens L71 may be configured as a plastic aspherical lens to appropriately adjust an incident angle of light incident on a peripheral portion of the image plane, according to the specifications of an image sensor, and contribute to a reduction in size of the whole optical lens assembly.

A diaphragm ST may be provided between the third lens L31 and the fourth lens L41. The diaphragm ST may serve to adjust a diameter of a light beam and include, for example, an aperture diaphragm, a variable diaphragm, or a mask-type stop. When the diaphragm ST is located between the third lens L31 and the fourth lens L41, sizes of all lenses may be reduced and a total external diameter of the optical lens assembly may also be reduced.

According to various embodiments, at least one optical device OD may be provided between the seventh lens L71 and the image plane IMG. The optical device OD may include, for example, at least one of a low pass filter, an infrared (IR)-cut filter, and cover glass. For example, when the IR-cut filter is provided as the optical device, visible light may be transmitted and IR light may be emitted outside not to be transmitted to the image plane. However, the optical lens assembly may also be configured without the optical device.

The optical lens assembly according to various embodiments may include at least one aspherical lens. For example, each of the second lens L21, the third lens L31, the fourth lens L41, the fifth lens L51, the sixth lens L61, and the seventh lens L71 of the optical lens assembly according to various embodiments may be an aspherical lens. For example, each of the second lens L21, the third lens L31, the fourth lens L41, the fifth lens L51, the sixth lens L61, and the seventh lens L71 may be a double aspherical lens. The first lens L11 may be a spherical lens.

The optical lens assembly according to various embodiments may include at least one plastic lens. For example, each of the second lens L21, the third lens L31, the fourth lens L41, the fifth lens L51, the sixth lens L61, and the seventh lens L71 may be a plastic lens. In the optical lens assembly according to various embodiments, manufacturing costs and lens thicknesses may be reduced by configuring five or more lenses as plastic lenses and thus the optical lens assembly may be reduced in size.

In the optical lens assembly according to various embodiments, focusing may be performed by moving the first to seventh lenses or the second to seventh lenses along the optical axis OA. Alternatively, the optical lens assembly according to various embodiments may be a fixed-focus optical system.

An image may be captured at an ultra-wide angle by using the above-described optical lens assembly. The optical lens assembly according to various embodiments may be mounted in a mobile device such as a cellular phone or a digital camera. Furthermore, the optical lens assembly according to various embodiments may be applied to security cameras, vehicle cameras, action cameras, etc.

In addition, when two or more optical lens assemblies according to various embodiments are appropriately used, omnidirectional imaging may be enabled. An omnidirectional image may be applied to a virtual reality (VR) or augmented reality (AR) image.

The optical lens assembly according to various embodiments may satisfy the following inequality. Inequalities shown below will be described with reference to the optical lens assembly 100-1 illustrated in FIG. 1 according to Numerical Embodiment 1. However, they may be equally applied to other embodiments.

$$120° \leq Fov \leq 200° \qquad \text{<Inequality 1>}$$

where Fov denotes a field of view. Inequality 1 indicates a field of view of an optical lens assembly, and the optical lens assembly according to various embodiments may implement an ultra-wide angle.

$$1.0 \leq TL/ImgH \leq 5 \qquad \text{<Inequality 2>}$$

where TL denotes a distance on the optical axis from the object side surface of the first lens to the image plane, and ImgH denotes an image height on the image plane. The optical lens assembly may be reduced in size but aberration may not be easily corrected when (TL/ImgH) is less than the lower limit of Inequality 2, and the optical lens assembly may not be easily reduced in size when (TL/ImgH) is greater than the upper limit of Inequality 2.

The optical lens assembly according to various embodiments may satisfy the following inequality.

$$2.0 \leq TL/ImgH \leq 5 \qquad \text{<Inequality 2-1>}$$

When Inequality 2-1 is satisfied, the optical lens assembly may be reduced in size and aberration may be easily corrected.

For example, the optical lens assembly according to various embodiments may satisfy the following inequality.

$$2.5 TL/ImgH \leq 5 \qquad \text{<Inequality 2-2>}$$

In the optical lens assembly according to various embodiments, astigmatism may be easily corrected because the object side surface of the seventh lens L71 has a shape that is convex toward the object side in a region around the optical axis and is concave toward the object side in a peripheral region, and the image side surface of the seventh lens L71 has a shape that is concave toward the image side in the region around the optical axis and is convex toward the image side in the peripheral region, and the optical lens assembly may be reduced in size by controlling an incident angle of a light beam incident on the image plane.

The optical lens assembly according to various embodiments may satisfy the following inequality.

$$1 \leq f_7/f \leq 10 \qquad \text{<Inequality 3>}$$

where $f_7$ denotes a focal length of the seventh lens, and f denotes a total focal length of the optical lens assembly.

The optical lens assembly according to various embodiments may not be easily reduced in size when ($f_7/f$) is greater than the upper limit, and aberration may not be easily corrected when ($f_7/f$) is less than the lower limit.

The optical lens assembly according to various embodiments may satisfy the following inequality.

$$1.4 \leq N_1 \leq 1.8 \qquad \text{<Inequality 4>}$$

where $N_1$ denotes a refractive index of a d-line wavelength of the first lens. The d-line wavelength may be 587.5600 nm.

When the refractive index of the first lens L11 is greater than the upper limit of Inequality 4, a reduction in size may be easily achieved due to use of a high refractive material but a lens tempering process may not be easy and thus damages or scratches may easily occur due to external impact. When the refractive index of the first lens L11 is less than the lower limit of Inequality 4, a reduction in size may not be easily achieved.

The optical lens assembly according to various embodiments may satisfy the following inequality.

$$25 \leq V_5 - V_6 \leq 40 \qquad \text{<Inequality 5>}$$

where $V_5$ denotes an Abbe number of the fifth lens, and $V_6$ denotes an Abbe number of the sixth lens.

Chromatic aberration may be easily corrected but production costs may be increased due to an increase in material costs when ($V_5-V_6$) is greater than the upper limit of Inequality 5, and chromatic aberration may not be easily corrected when ($V_5-V_6$) is less than the lower limit of Inequality 5.

Figure 3:
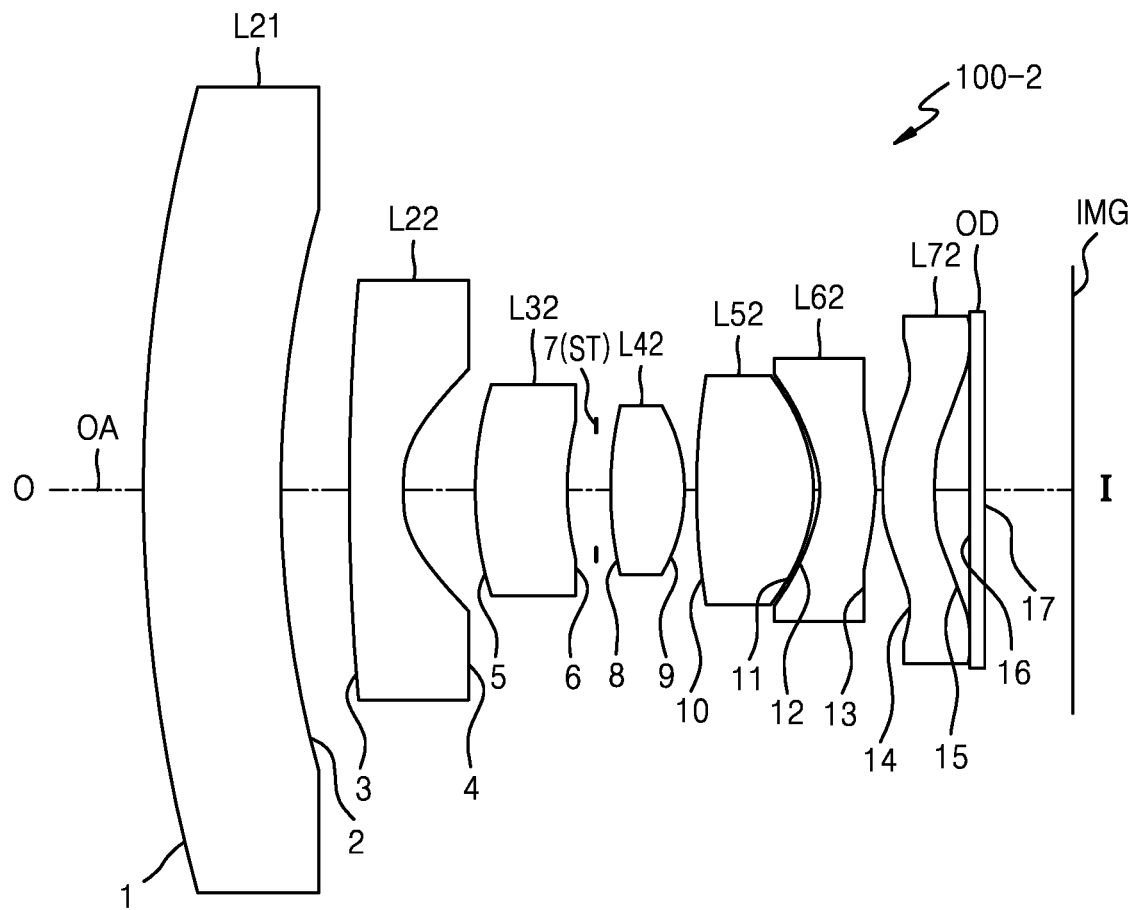
FIG. 3 illustrates an optical lens assembly of Numerical Embodiment 2, according to various embodiments.

FIG. 3 illustrates an optical lens assembly 100-2 of Numerical Embodiment 2, according to various embodiments.

The optical lens assembly 100-2 may include a first lens L12, a second lens L22, a third lens L32, a fourth lens L42, a fifth lens L52, a sixth lens L62, and a seventh lens L72 arranged from an object side O to an image side I. A diaphragm ST may be provided between the third lens L32 and the fourth lens L42. The first lens L12, the second lens L22, and the third lens L32 may have a meniscus shape convex toward the object side O. Each lens of the optical lens assembly 100-2 of Numerical Embodiment 2 is substantially the same as that of the optical lens assembly 100-1 of Numerical Embodiment 1 and thus a detailed description thereof is not provided herein.

Figure 5:
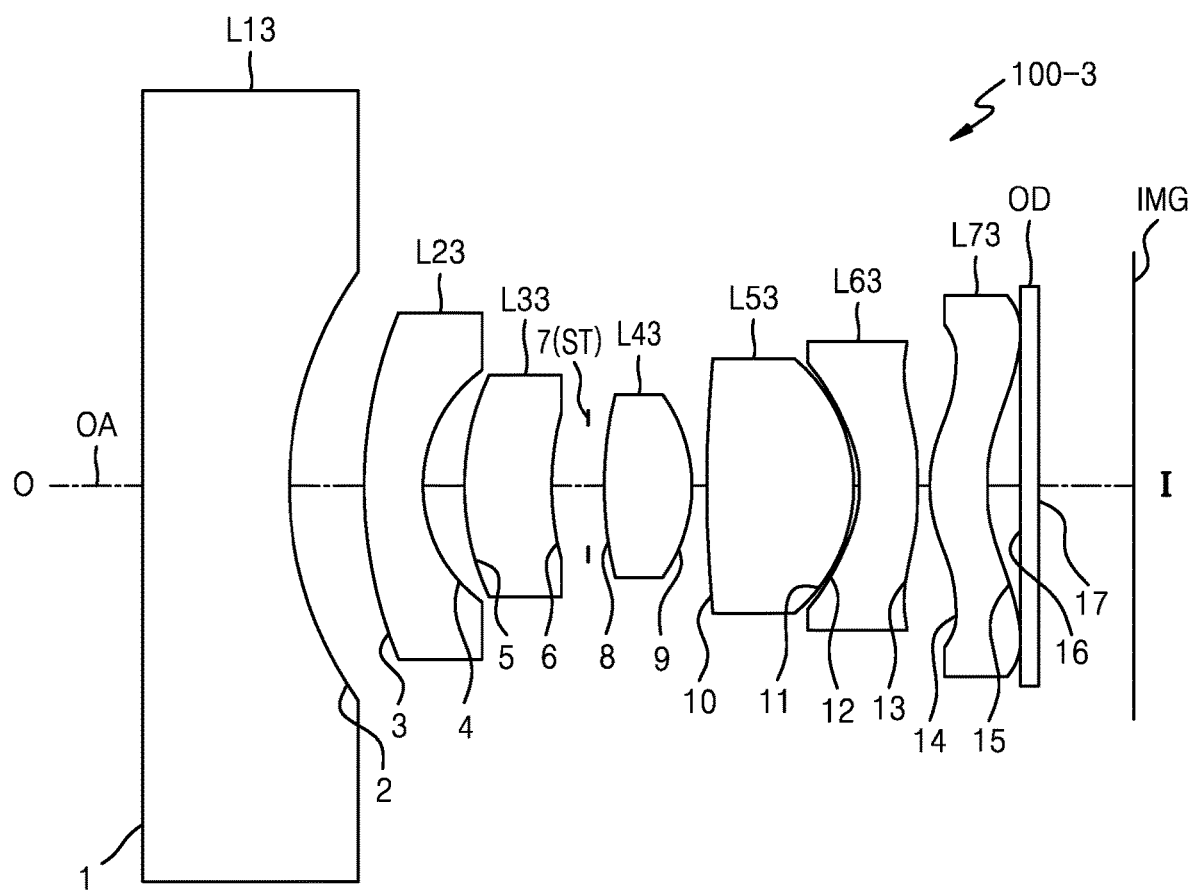
FIG. 5 illustrates an optical lens assembly of Numerical Embodiment 3, according to various embodiments.

FIG. 5 illustrates an optical lens assembly 100-3 of Numerical Embodiment 3, according to various embodiments.

The optical lens assembly 100-3 may include a first lens L13, a second lens L23, a third lens L33, a fourth lens L43, a fifth lens L53, a sixth lens L63, and a seventh lens L73 arranged from an object side O to an image side I. A diaphragm ST may be provided between the third lens L33 and the fourth lens L43. The first lens L13 may include a flat object side surface 1. The first lens L13 may include a concave image side surface 2. The second lens L23 and the third lens L33 may have a meniscus shape convex toward the object side O. The other configurations of the optical lens assembly 100-3 of Numerical Embodiment 3 are substantially the same as those of the optical lens assembly 100-1 of Numerical Embodiment 1 and thus a detailed description thereof is not provided herein.

Meanwhile, the term "aspherical" used for the optical lens assembly according to various embodiments is defined as described below.

Assuming that an optical axis direction is an x axis, a direction perpendicular to the optical axis direction is a y axis, and a proceeding direction of a light beam is a positive direction, an aspherical shape may be represented by the following equation. In the following equation, x denotes a distance in the optical axis direction from a vertex of a lens, y denotes a distance in the direction perpendicular to the optical axis, K denotes a conic constant, A, B, C, D, . . . denote aspherical coefficients, and c denotes an inverse of a radius of curvature (1/R) at the vertex of the lens.

$$x = \frac{cy^2}{1+\sqrt{1-(K+1)c^2y^2}} + Ay^4 + By^6 + Cy^8 + Dy^{10} + \cdots \quad \text{<Equation 6>}$$

In the present disclosure, the optical lens assembly may be implemented according to various numerical embodiments based on designs as described below.

In each numerical embodiment, lens surface numbers 1, 2, 3, . . . , n (n is a natural number) are sequentially given from the object side O to the image side I. In addition, f denotes a focal length of the optical lens assembly, FNO denotes an F number, 2w denotes a field of view (Fov), ImgH denotes an image height, R denotes a radius of curvature, Dn denotes a lens thickness or an air gap between lenses, Nd denotes a refractive index, and Vd denotes an Abbe number. ST denotes a diaphragm, and OBJ denotes an object. * denotes an aspherical surface.

Numerical Embodiment 1

FIG. 1 illustrates the optical lens assembly 100-1 of Numerical Embodiment 1, according to various embodiments, and Table 1 shows, for example, design data of Numerical Embodiment 1.

f; 1.122 mm FNO; 2.06 2w; 180° ImgH; 2.0 mm

TABLE 1

| Lens surface | R | Dn | Nd | Vd |
|---|---|---|---|---|
| OBJ: | INFINITY | INFINITY | | |
| 1 | 15.25189 | 0.800000 | 1.516798 | 64.1983 |
| 2 | 2.32022 | 0.500000 | | |
| 3 | 3.32394 | 0.400000 | 1.544100 | 56.0900 |
| ASP: | | | | |
| K: 3.169042 | | | | |
| A: 0.120349E-01 B: -0.447045E-02 C: -0.275433E-02 | | | | |
| D: 0.593702E-03 E: -0.265948E-05 F: -0.282817E-05 | | | | |
| G: 0.369432E-06 | | | | |
| 4 | 0.73295 | 0.243876 | | |
| ASP | | | | |
| K: -0.697011 | | | | |
| A: -0.934643E-01 B: 0.445539E-02 C: -0.118349E+00 | | | | |
| D: -0.388768E+00 E: 0.311568E+00 F: 0.867300E-01 | | | | |
| G: 0.000000E+00 | | | | |
| 5: | 1.46374 | 0.516576 | 1.651000 | 21.4900 |
| ASP | | | | |
| K: -14.536673 | | | | |
| A: 0.464017E+00 B: -.100580E+01 C: 0.133799E+01 | | | | |
| D: -0.105032E+01 E: 0.500370E-01 F: 0.191012E+00 | | | | |
| G: 0.670344E-01 | | | | |
| 6 | 2.53788 | 0.264787 | | |

TABLE 1-continued

| Lens surface | R | Dn | Nd | Vd |
|---|---|---|---|---|
| ASP: | | | | |
| K: 15.351812 | | | | |
| A: 0.184336E+00 B: -0.167471E+00 C: 0.155373E+01 | | | | |
| D: -0.267437E+01 E: -0.277134E-10 F: -0.254484E-11 | | | | |
| G: -0.257489E-12 | | | | |
| 7(ST) | INFINITY | 0.100000 | | |
| 8 | 3.61692 | 0.562691 | 1.544100 | 56.0900 |
| ASP: | | | | |
| K: -11.720066 | | | | |
| A: 0.124242E+00 B: -0.338828E+00 C: 0.126348E+01 | | | | |
| D: -0.113609E+01 E: 0.220196E-09 F: 0.614282E-11 | | | | |
| G: 0.835866E-12 | | | | |
| 9 | -1.08645 | 0.100000 | | |
| ASP: | | | | |
| K: 0.368388 | | | | |
| A: 0.939502E-01 B: 0.731963E-01 C: -0.374933E+00 | | | | |
| D: 0.100279E+01 E: -0.163502E-06 F: -0.259908E-07 | | | | |
| G: -0.481175E-08 | | | | |
| 10 | 5.19788 | 0.792388 | 1.544100 | 56.0900 |
| ASP: | | | | |
| K: 9.609593 | | | | |
| A: -0.249548E-01 B: -0.102427E+00 C: 0.928604E-01 | | | | |
| D: 0.853601E-02 E: -0.980229E-01 F: 0.235361E-01 | | | | |
| G: -0.155101E-01 | | | | |
| 11 | -1.01321 | 0.050000 | | |
| ASP: | | | | |
| K: -0.392075 | | | | |
| A: 0.902672E-01 B: 0.123536E-01 C: 0.194594E-02 | | | | |
| D: -.288150E-01 E: 0.240951E-01 F: 0.550832E-02 | | | | |
| G: -.434572E-02 | | | | |
| 12 | -0.57192 | 0.400000 | 1.651000 | 21.4900 |
| ASP: | | | | |
| K: -3.308583 | | | | |
| A: 0.212772E+00 B: -0.389706E+00 C: 0.282509E+00 | | | | |
| D: -0.172787E+00 E: -0.425827E-01 F: 0.575821E-01 | | | | |
| G: -0.368409E-02 | | | | |
| 13 | -1.41920 | 0.073161 | | |
| ASP: | | | | |
| K: -4.951383 | | | | |
| A: 0.379219E+00 B: -0.262061E+00 C: 0.680933E-01 | | | | |
| D: -0.927615E-03 E: -0.237555E-02 F: -0.101668E-02 | | | | |
| G: 0.639924E-03 | | | | |
| 14 | 0.83681 | 0.388516 | 1.544100 | 56.0900 |
| ASP: | | | | |
| K: -3.584649 | | | | |
| A: -0.104569E+00 B: -0.100895E+00 C: -0.212065E-02 | | | | |
| D: 0.136775E-01 E: 0.223811E-02 F: 0.456626E-03 | | | | |
| G: -.363053E-03 | | | | |
| 15 | 1.11869 | 0.248005 | | |
| ASP: | | | | |
| K: -0.987273 | | | | |
| A: -0.217406E+00 B: -0.944872E-02 C: 0.279297E-01 | | | | |
| D: -0.670624E-02 E: -0.106503E-02 F: -0.134130E-03 | | | | |
| G: 0.153325E-03 | | | | |
| 16 | INFINITY | 0.110000 | 1.516798 | 64.1983 |
| 17 | INFINITY | 0.656748 | | |
| IMG | INFINITY | | | |

Figure 2:
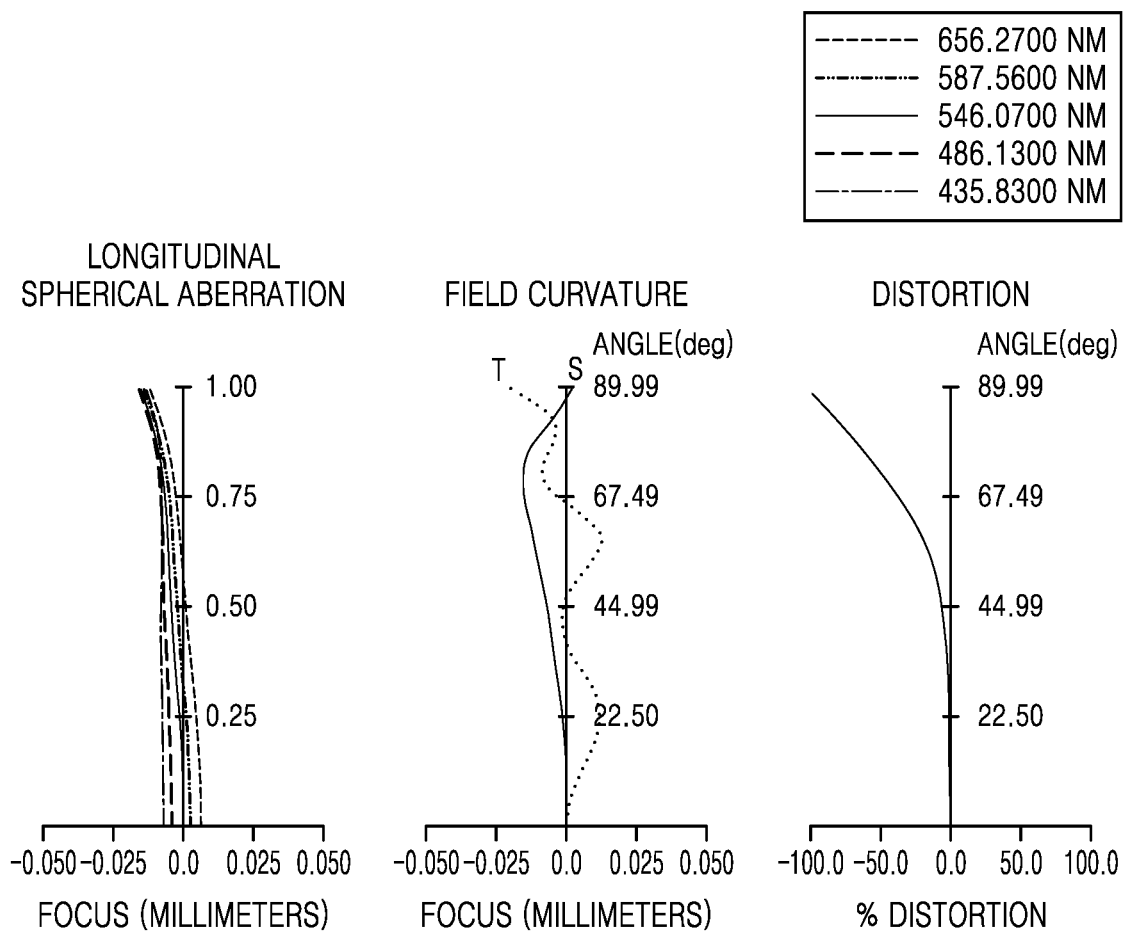
FIG. 2 shows aberration of the optical lens assembly according to Numerical Embodiment 1, according to various embodiments.

FIG. 2 shows longitudinal spherical aberration, astigmatic field curves, and distortion of the optical lens assembly 100-1 according to Numerical Embodiment 1 of the present disclosure. The longitudinal spherical aberration is plotted with respect to, for example, light having wavelengths of 656.2700 nanometers (NM), 587.5600 NM, 546.0700 NM, 486.1300 NM, and 435.8300 NM, and a tangential field curvature T and a sagittal field curvature S are shown as the astigmatic field curves. The astigmatic field curves and the distortion are plotted with respect to light having a wavelength of 587.5600 NM.

Numerical Embodiment 2

FIG. 3 illustrates the optical lens assembly 100-2 of Numerical Embodiment 2, according to various embodiments, and Table 2 shows, for example, design data of Numerical Embodiment 2.

f; 1.152 mm FNO; 2.22 2w; 124° ImgH; 1.614 mm

TABLE 2

| Lens surface | R | Dn | Nd | Vd |
|---|---|---|---|---|
| OBJ: | INFINITY | INFINITY | | |
| 1 | 11.60439 | 1.000000 | 1.516798 | 64.1983 |
| 2 | 7.96451 | 0.500000 | | |
| 3 | 18.93663 | 0.400000 | 1.544100 | 56.0900 |
| ASP: | | | | |
| K: −7.77121 | | | | |
| A: 0.304994E−02 B: −0.236768E−03 C: 0.848496E−04 | | | | |
| D: 0.397499E−04 E: −0.265948E−05 F: −0.282817E−05 | | | | |
| G: 0.369432E−06 | | | | |
| 4 | 0.76844 | 0.540597 | | |
| ASP: | | | | |
| K: −0.536515 | | | | |
| A: −.187893E+00 B: 0.916876E−01 C: −0.186667E+00 | | | | |
| D: −0.201710E+00 E: 0.311568E+00 F: 0.867300E−01 | | | | |
| G: −0.215871E+00 | | | | |
| 5 | 1.94023 | 0.676934 | 1.651000 | 21.4900 |
| ASP: | | | | |
| K: −29.953666 | | | | |
| A: 0.343433E+00 B: −0.103342E+01 C: 0.144595E+01 | | | | |
| D: −0.109908E+01 E: 0.500370E−01 F: 0.191012E+00 | | | | |
| G: 0.670344E−01 | | | | |
| 6 | 3.20119 | 0.207538 | | |
| ASP: | | | | |
| K: 26.998344 | | | | |
| A: 0.366008E−01 B: −0.339967E+00 C: 0.984382E+00 | | | | |
| D: −0.343266E+01 E: −0.277134E−10 F: −0.254484E−11 | | | | |
| G: −0.257489E−12 | | | | |
| 7(ST) | INFINITY | 0.100000 | | |
| 8 | 3.83917 | 0.539072 | 1.544100 | 56.0900 |
| ASP: | | | | |
| K: −10.386961 | | | | |
| A: 0.118698E+00 B: −0.333839E+00 C: 0.104270E+01 | | | | |
| D: −.112340E+01 E: 0.220196E−09 F: 0.614282E−11 | | | | |
| G: 0.835866E−12 | | | | |
| 9 | −1.22057 | 0.100000 | | |
| ASP: | | | | |
| K: 0.392414 | | | | |
| A: 0.108489E+00 B: 0.457168E−01 C: −0.392500E+00 | | | | |
| D: 0.613981E+00 E: −0.163502E−06 F: −0.259908E−07 | | | | |
| G: −0.481175E−08 | | | | |
| 10 | 4.13728 | 0.858031 | 1.544100 | 56.0900 |
| ASP: | | | | |
| K: 14.720635 | | | | |
| A: −0.145943E−01 B: −0.113583E+00 C: 0.931483E−01 | | | | |
| D: −0.397624E−01 E: −0.980229E−01 F: 0.235361E−01 | | | | |
| G: −0.155101E−01 | | | | |
| 11 | −1.01852 | 0.050000 | | |
| ASP: | | | | |
| K: −0.461798 | | | | |
| A: 0.123476E+00 B: 0.247721E−01 C: −0.173538E−01 | | | | |
| D: −0.101445E+00 E: 0.240951E−01 F: 0.550832E−02 | | | | |
| G: −0.434572E−02 | | | | |
| 12 | −0.55891 | 0.400000 | 1.651000 | 21.4900 |
| ASP: | | | | |
| K: −3.374730 | | | | |
| A: 0.231415E+00 B: −0.387079E+00 C: 0.272841E+00 | | | | |
| D: −0.200070E+00 E: −0.425827E−01 F: 0.575821E−01 | | | | |
| G: −0.368409E−02 | | | | |
| 13 | −1.24635 | 0.055216 | | |
| ASP: | | | | |
| K: −7.923890 | | | | |
| A: 0.350389E+00 B: −0.259872E+00 C: 0.766211E−01 | | | | |
| D: −0.364833E−02 E: −0.237555E−02 F: −0.101668E−02 | | | | |
| G: 0.639924E−03 | | | | |
| 14 | 0.89960 | 0.378274 | 1.544100 | 56.0900 |

TABLE 2-continued

| Lens surface | R | Dn | Nd | Vd |
|---|---|---|---|---|
| ASP: | | | | |
| K: −3.244377 | | | | |
| A: −0.154598E+00 B: −0.467801E−01 C: 0.166654E−04 | | | | |
| D: 0.737235E−02 E: 0.223811E−02 F: 0.456626E−03 | | | | |
| G: −0.363053E−03 | | | | |
| 15 | 1.05988 | 0.269153 | | |
| ASP: | | | | |
| K: −1.380836 | | | | |
| A: −0.208987E+00 B: 0.236098E−01 C: 0.855188E−02 | | | | |
| D: −0.252866E−02 E: −0.106503E−02 F: −0.134130E−03 | | | | |
| G: 0.153325E−03 | | | | |
| 16 | INFINITY | 0.110000 | 1.516798 | 64.1983 |
| 17 | INFINITY | 0.657505 | | |
| IMG | INFINITY | | | |

Figure 4:
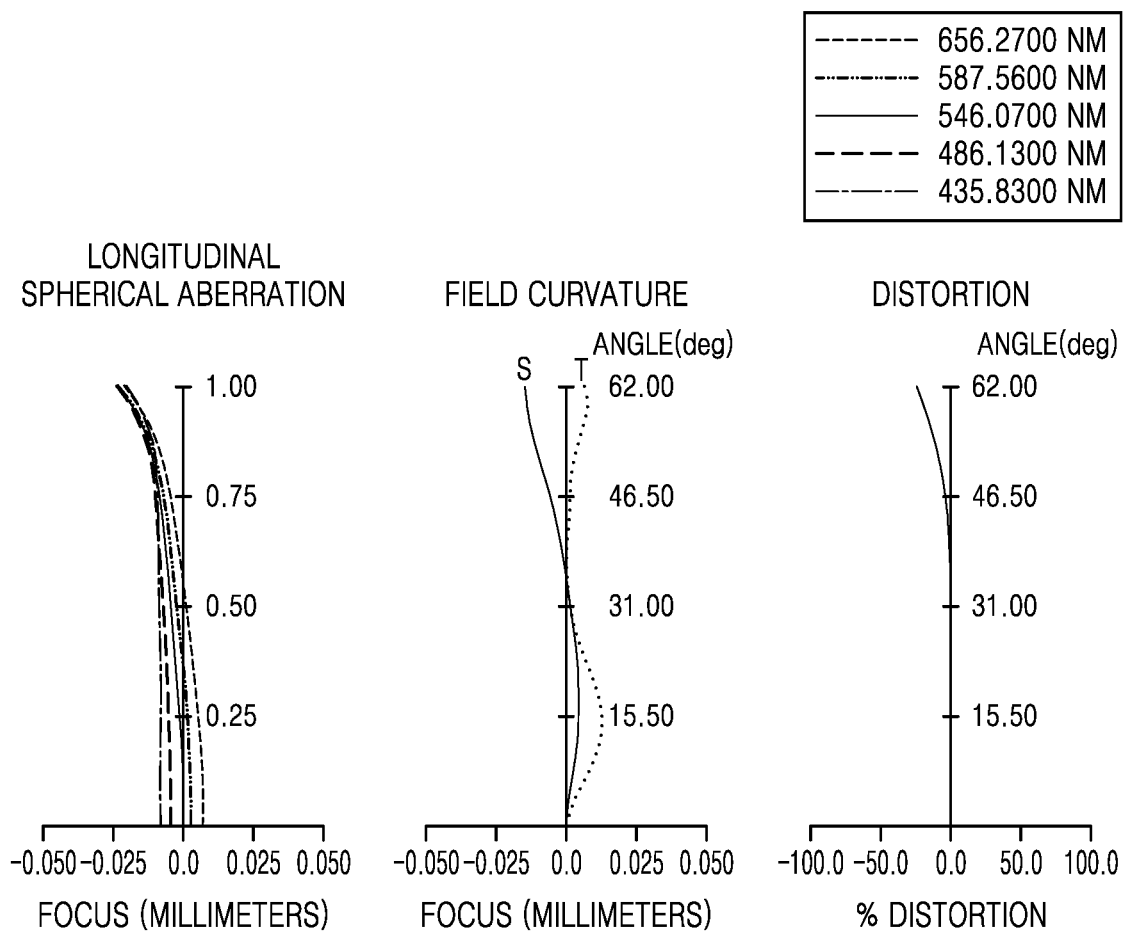
FIG. 4 shows aberration of the optical lens assembly according to Numerical Embodiment 2, according to various embodiments.

FIG. 4 shows longitudinal spherical aberration, astigmatic field curves, and distortion of the optical lens assembly 100-2 according to Numerical Embodiment 2 of the present disclosure.

Numerical Embodiment 3

FIG. 5 illustrates the optical lens assembly 100-3 of Numerical Embodiment 3, according to various embodiments, and Table 3 shows, for example, design data of Numerical Embodiment 3.

f; 1.08 mm FNO; 2.07 2w; 150° ImgH; 1.583 mm

TABLE 3

| Lens surface | R | Dn | Nd | Vd |
|---|---|---|---|---|
| OBJ | INFINITY | INFINITY | | |
| 1 | INFINITY | 1.000000 | 1.516798 | 64.1983 |
| 2 | 2.49348 | 0.500000 | | |
| 3 | 3.22500 | 0.400485 | 1.544100 | 56.0900 |
| ASP: | | | | |
| K: 2.086989 | | | | |
| A: 0.952955E−02 B: −0.708916E−02 C: −0.309705E−02 | | | | |
| D: 0.110595E−02 E: −0.265948E−05 F: −0.282817E−05 | | | | |
| G: 0.369432E−06 | | | | |
| 4 | 0.75775 | 0.279672 | | |
| ASP: | | | | |
| K: −0.657946 | | | | |
| A: −0.943829E−01 B: 0.150038E−01 C: −0.975500E−01 | | | | |
| D: −0.384638E+00 E: 0.311568E+00 F: 0.867300E−01 | | | | |
| G: 0.000000E+00 | | | | |
| 5 | 1.60354 | 0.585104 | 1.651000 | 21.4900 |
| ASP: | | | | |
| K: −18.388180 | | | | |
| A: 0.471959E+00 B: −0.100573E+01 C: 0.133701E+01 | | | | |
| D: −0.103838E+01 E: 0.500370E−01 F: 0.191012E+00 | | | | |
| G: 0.670344E−01 | | | | |
| 6 | 2.67925 | 0.272380 | | |
| ASP: | | | | |
| K: 15.998948 | | | | |
| A: 0.173906E+00 B: −0.195020E+00 C: 0.132372E+01 | | | | |
| D: −0.228886E+01 E: −0.277134E−10 F: −0.254484E−11 | | | | |
| G: −0.257489E−12 | | | | |
| 7(ST) | INFINITY | 0.100000 | | |
| 8 | 3.75067 | 0.589580 | 1.544100 | 56.0900 |
| ASP: | | | | |
| K: −10.557539 | | | | |
| A: 0.124105E+00 B: −0.308129E+00 C: 0.120779E+01 | | | | |
| D: −0.112014E+01 E: 0.220196E−09 F: 0.614282E−11 | | | | |
| G: 0.835866E−12 | | | | |
| 9 | −1.08783 | 0.100739 | | |
| ASP: | | | | |
| K: 0.300612 | | | | |
| A: 0.979892E−01 B: 0.882801E−01 C: −0.362851E+00 | | | | |
| D: 0.995920E+00 E: −0.163502E−06 F: −0.259908E−07 | | | | |
| G: −0.481175E−08 | | | | |
| 10 | 5.88269 | 0.987371 | 1.544100 | 56.0900 |

TABLE 3-continued

| Lens surface | R | Dn | Nd | Vd |
|---|---|---|---|---|
| ASP: K: 12.690451 A: −0.271409E−01 B: −0.104552E+00 C: 0.898725E−01 D: 0.141061E−01 E: −0.980229E−01 F: 0.235361E−01 G: −0.155101E−01 | | | | |
| 11 | −0.98767 | 0.050034 | | |
| ASP: K: −0.396263 A: 0.945953E−01 B: 0.115630E−01 C: 0.600382E−04 D: −0.310551E−01 E: 0.240951E−01 F: 0.550832E−02 G: −0.434572E−02 | | | | |
| 12 | −0.56283 | 0.400000 | 1.651000 | 21.4900 |
| ASP: K: −3.182824 A: 0.215358E+00 B: −0.383576E+00 C: 0.288585E+00 D: −0.167401E+00 E: −0.425827E−01 F: 0.575821E−01 G: −0.368409E−02 | | | | |
| 13 | −1.39395 | 0.073515 | | |
| ASP: K: −4.610706 A: 0.376356E+00 B: −0.256470E+00 C: 0.615895E−01 D: 0.775436E−02 E: −0.237555E−02 F: −0.101668E−02 G: 0.639924E−03 | | | | |
| 14 | 0.86394 | 0.388311 | 1.544100 | 56.0900 |
| ASP: K: −3.993978 A: −0.115322E+00 B: −0.105481E+00 C: −0.247021E−02 D: 0.211153E−01 E: 0.223811E−02 F: 0.456626E−03 G: −0.363053E−03 | | | | |
| 15 | 1.18641 | 0.232998 | | |
| ASP: K: −0.926914 A: −0.212140E+00 B: −0.164990E−01 C: 0.288844E−01 D: −0.846471E−02 E: −0.106503E−02 F: −0.134130E−03 G: 0.153325E−03 | | | | |
| 16 | INFINITY | 0.110000 | 1.516798 | 64.1983 |
| 17 | INFINITY | 0.653432 | | |
| IMG: | INFINITY | | | |

Figure 6:
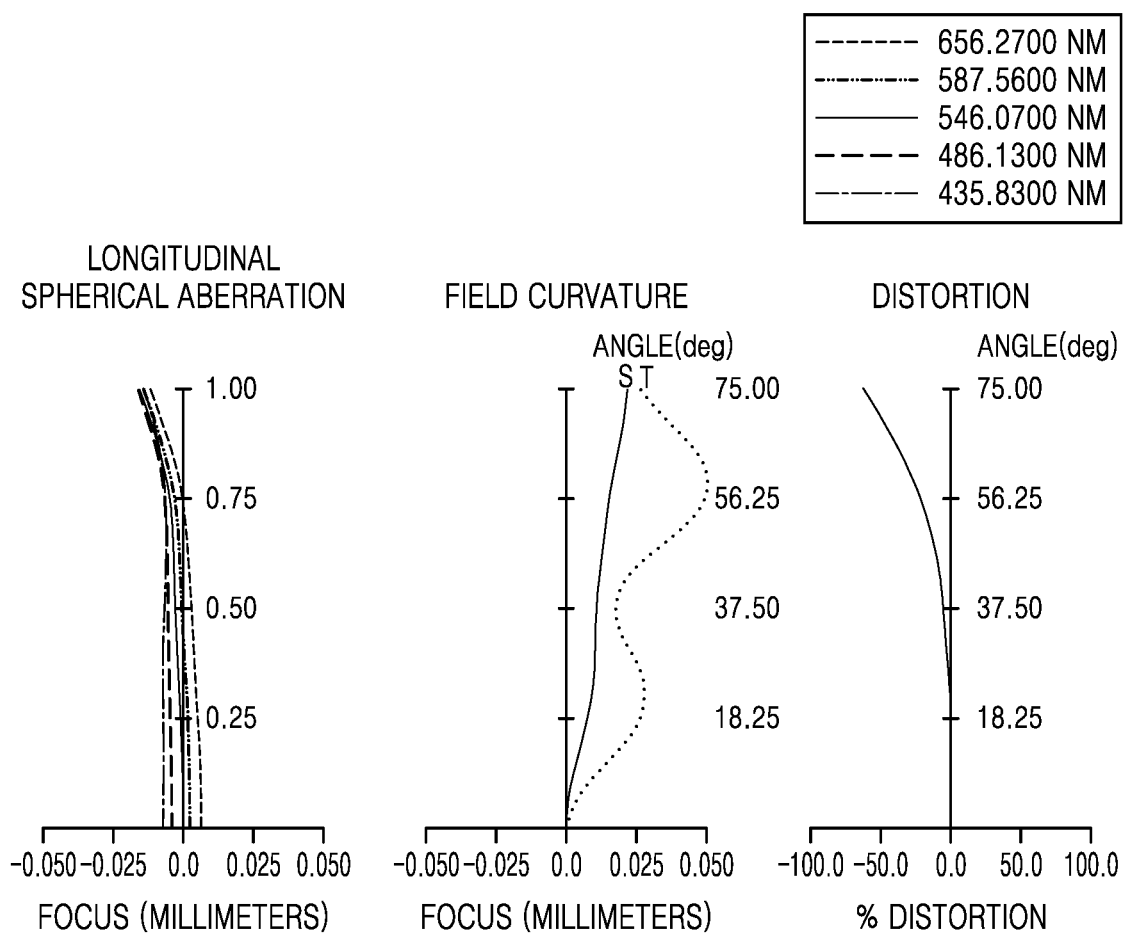
FIG. 6 shows aberration of the optical lens assembly according to Numerical Embodiment 3, according to various embodiments.

FIG. 6 shows longitudinal spherical aberration, astigmatic field curves, and distortion of the optical lens assembly 100-3 according to Numerical Embodiment 3 of the present disclosure.

It is shown below that the optical lens assembly according to various embodiments satisfies Inequalities 1 to 5.

TABLE 4

| | Embodiment | | |
|---|---|---|---|
| | Embodiment 1 | Embodiment 2 | Embodiment 3 |
| Inequality 1 | 180 | 124 | 150 |
| Inequality 2 | 3.1 | 4.234 | 4.247 |
| Inequality 3 | 3.641 | 5.153 | 3.748 |
| Inequality 4 | 1.516798 | 1.516798 | 1.516798 |
| Inequality 5 | 34.6 | 34.6 | 34.6 |

Figure 7:
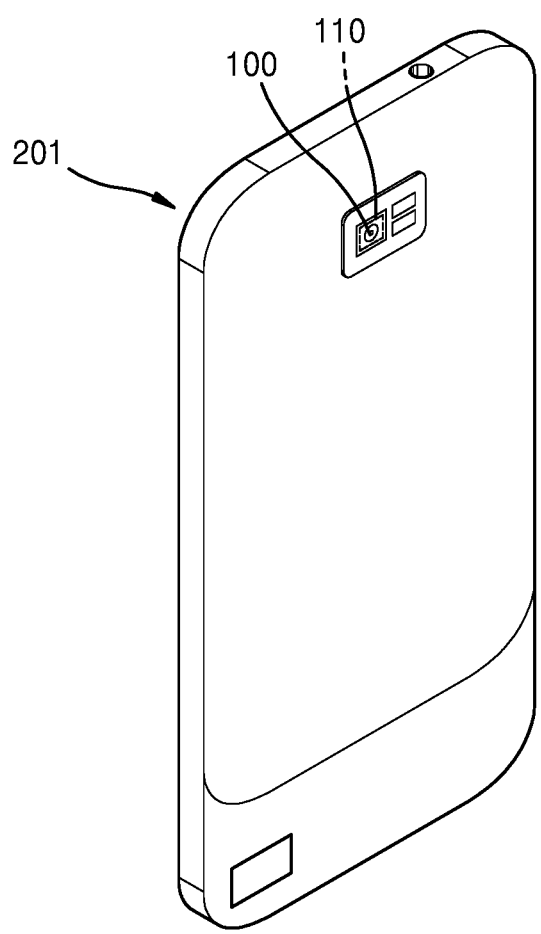
FIG. 7 illustrates an example of an electronic device including an optical lens assembly, according to various embodiments.

The optical lens assembly according to various embodiments may be applied to, for example, an electronic device employing an image sensor. The optical lens assembly according to an example embodiment may be applied to various electronic devices such as digital cameras, interchangeable-lens cameras, video cameras, cellphone cameras, and cameras for small mobile devices FIG. 7 illustrates an example of an electronic device 201 including an optical lens assembly, according to an example embodiment. The electronic device 201 is applied to a mobile phone in FIG. 7 but is not limited thereto. The electronic device 201 may include at least one optical lens assembly 100, and an image sensor 110 for receiving an image formed by the at least one optical lens assembly 100 and converting the image into an electrical image signal. Any of the optical lens assemblies described above in relation to FIGS. 1 to 6 may be employed as the optical lens assembly 100. A high-performance imaging device may be implemented by applying the optical lens assembly according to various embodiments to an imaging device such as a small digital camera or a mobile phone.

The image sensor 110 may include, for example, a CMOS sensor or a CCD sensor. The image sensor is not limited thereto and may be, for example, a device for converting an image of an object into an electrical image signal.

In addition, because the optical lens assembly according to various embodiments has a small size, a high performance, and a large field of view equal to or greater than 120°, 2, 3, or N (N is a natural number equal to or greater than 4) optical lens assemblies may be used to configure an imaging means for obtaining a high-resolution omnidirectional image.

Figure 8:
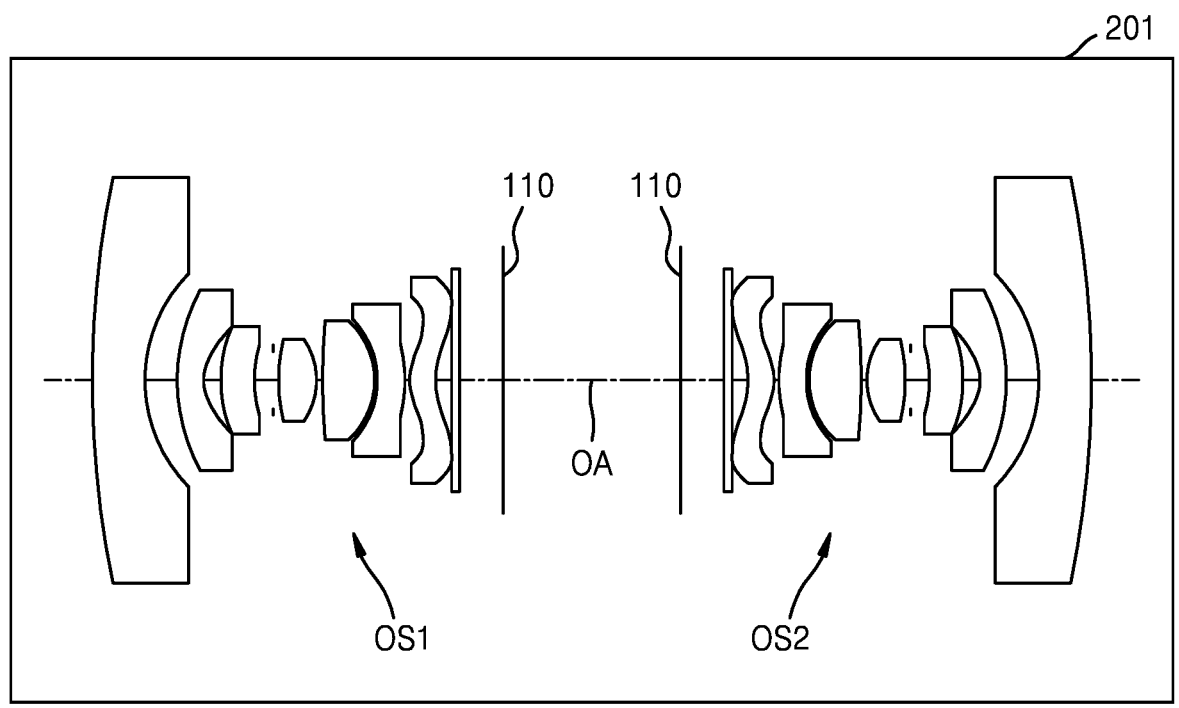
FIG. 8 illustrates an electronic device including two optical lens assemblies arranged in a line, according to various embodiments.

FIG. 8 illustrates another example of an electronic device 201 including optical lens assemblies, according to an example embodiment. The electronic device 201 may include a plurality of optical lens assemblies according to various embodiments. For example, a first optical lens assembly OS1 and a second optical lens assembly OS2 may be arranged on a single optical axis OA. For example, the first optical lens assembly OS1 and the second optical lens assembly OS2 may be arranged in a line in such a manner that image sensors 110 thereof face each other. As such, omnidirectional imaging may be enabled. The arrangement method is not limited thereto, and two optical lens assemblies or three or more optical lens assemblies may be arranged using various methods. An omnidirectional image may be obtained by stitching images captured by the plurality of optical lens assemblies.

The electronic device according to various embodiments may be applied to mobile devices, virtual reality devices, augmented reality devices, surround view input devices of vehicles, vision systems of unmanned transport equipment, imaging devices for driving vehicles, etc.

Figure 9:
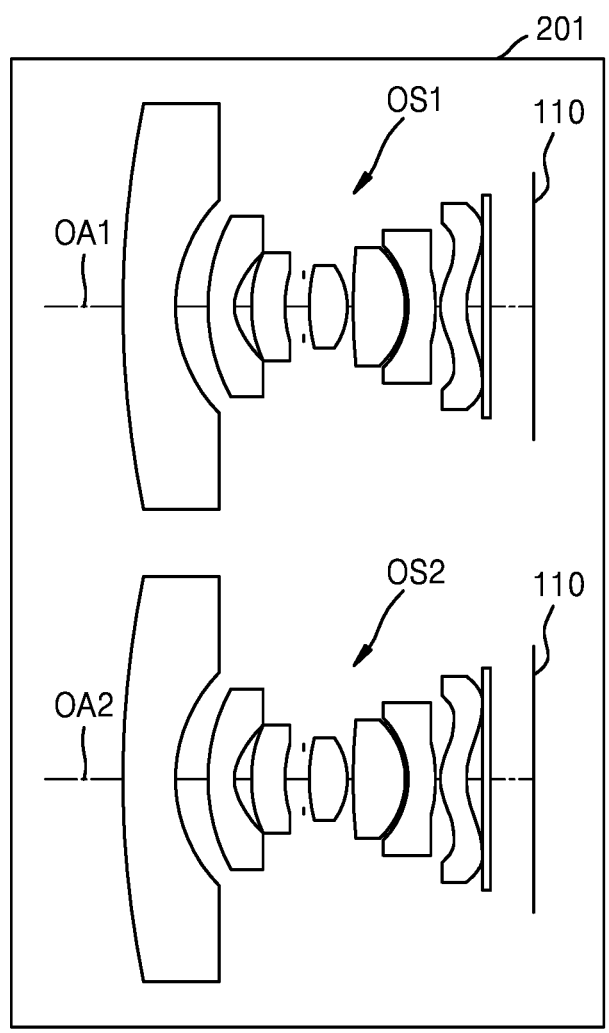
FIG. 9 illustrates an electronic device including two optical lens assemblies arranged in parallel, according to various embodiments.

FIG. 9 illustrates another example of an electronic device 201 including optical lens assemblies, according to an example embodiment. The electronic device 201 may include a plurality of optical lens assemblies according to various embodiments. For example, a first optical lens assembly OS1 may be provided on a first optical axis OA1, and a second optical lens assembly OS2 may be provided on a second optical axis OA2. The first optical lens assembly OS1 and the second optical lens assembly OS2 may be arranged in parallel, and image sensors 110 thereof may be arranged adjacent to each other.

A three-dimensional (3D) image may be captured using the first optical lens assembly OS1 and the second optical lens assembly OS2. The electronic device according to various embodiments may be applied to various 3D imaging devices.

Figure 10:
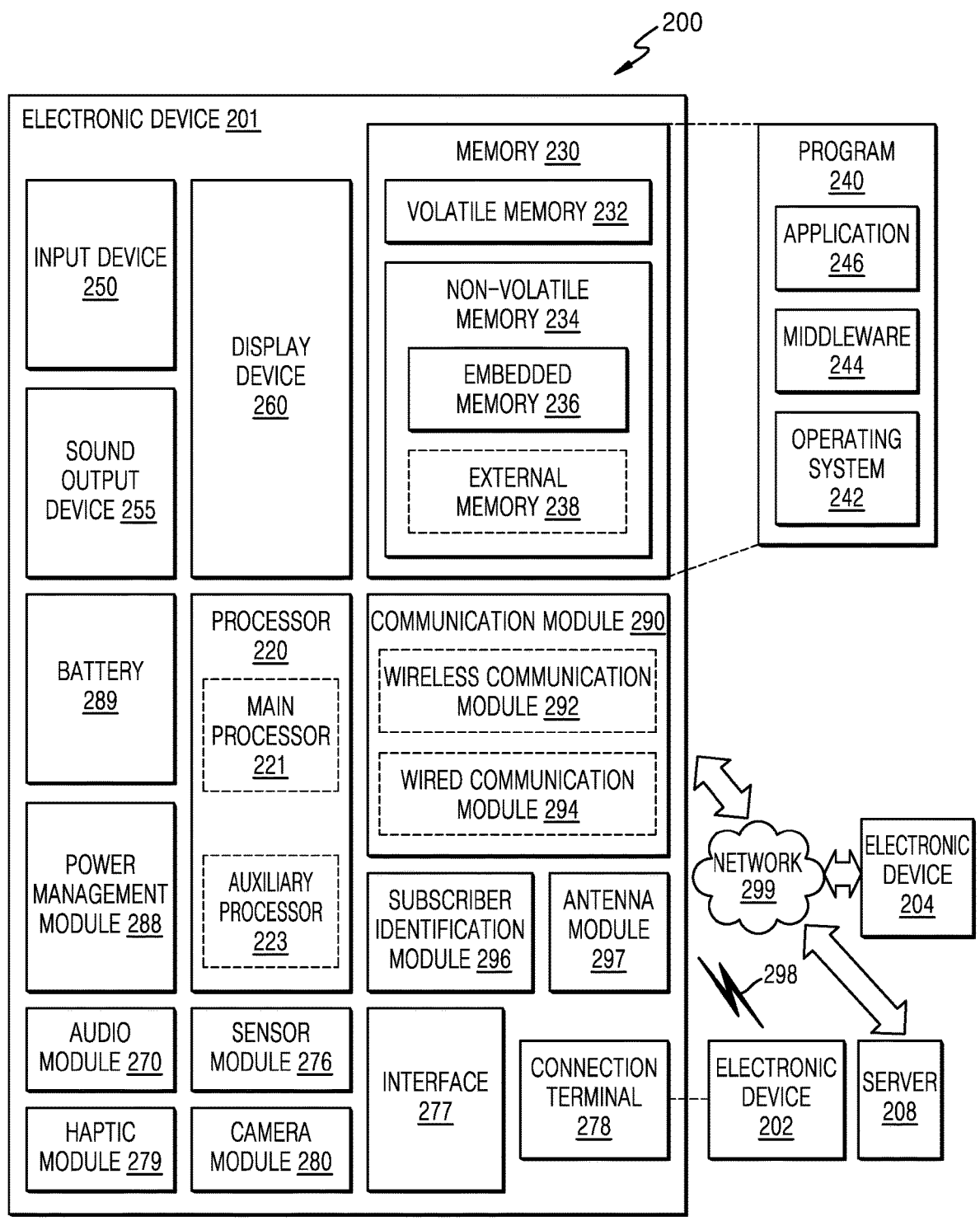
FIG. 10 is a block diagram of an electronic device in a network environment, according to various embodiments.

FIG. 10 is a block diagram of an electronic device 201 in a network environment 200, according to various embodiments. Referring to FIG. 10, the electronic device 201 in the network environment 200 may communicate with an electronic device 202 through a first network 298 (e.g., a short-range wireless communication network), or communicate with an electronic device 204 or a server 208 through a second network 299 (e.g., a long-range wireless communication network). According to an embodiment, the electronic device 201 may communicate with the electronic device 204 via the server 208. According to an embodiment, the electronic device 201 may include a processor 220, a memory 230, an input device 250, a sound output device 255, a display device 260, an audio module 270, a sensor module 276, an interface 277, a haptic module 279, a camera module 280, a power management module 288, a battery 289, a communication module 290, a subscriber identification module 296, and an antenna module 297. In some embodiments, at least one of the above-mentioned elements (e.g., the display device 260 or the camera module 280) may be omitted from or any other element may be added to the electronic device 201. In some embodiments, some elements may be integrated and thus, for example, the sensor module 276 (e.g., a fingerprint sensor, an iris scanner, or an ambient light sensor) may be embedded in the display device 260 (e.g., a display).

The processor 220 may control at least one other element (e.g., a hardware or software element) of the electronic device 201 connected to the processor 220, by driving, for example, software (e.g., a program 240), and perform various types of data processing and calculation. The processor 220 may load a command or data received from another element (e.g., the sensor module 276 or the communication module 290), in a volatile memory 232, and process the command or data, and store resultant data in a non-volatile memory 234. According to an embodiment, the processor 220 may include a main processor 221 (e.g., a central processing unit (CPU) or an application processor), and an auxiliary processor 223 (e.g., a graphic processing unit, an image signal processor, a sensor hub processor, or a communication processor) operating independently of the main processor 221 and, additionally or alternatively, consuming lower power compared to the main processor 221 or specialized for a designated function. Herein, the auxiliary processor 223 may be separate from or embedded in the main processor 221.

In this case, the auxiliary processor 223 may control at least some of functions or modes related to at least one of the elements of the electronic device 201 (e.g., the display device 260, the sensor module 276, or the communication module 290), for example, on behalf of the main processor 221 while the main processor 221 is inactive (e.g., sleeping) or together with the main processor 221 while the main processor 221 is active (e.g., executing an application). According to an embodiment, the auxiliary processor 223 (e.g., the image signal processor or the communication processor) may be implemented as a part of another functionally-related element (e.g., the camera module 280 or the communication module 290). The memory 230 may store various data used by at least one element of the electronic device 201 (e.g., the processor 220 or the sensor module 276), for example, software (e.g., the program 240) and input data or output data for a command related thereto. The memory 230 may include the volatile memory 232 or the non-volatile memory 234.

The program 240 is software stored in the memory 230 and may include, for example, an operating system 242, middleware 244, or an application 246.

The input device 250 is a device for receiving a command or data to be used an element of the electronic device 201 (e.g., the processor 220), from outside the electronic device 201 (e.g., a user) and may include, for example, a microphone, a mouse, or a keyboard.

The sound output device 255 is a device for outputting sound signals to the outside of the electronic device 201 and may include, for example, a speaker used for general purposes such as multimedia reproduction or recorded data reproduction, or a receiver used for receiving incoming calls. According to an embodiment, the receiver may be configured integrally with or separately from the speaker.

The display device 260 is a device for visually providing information to a user of the electronic device 201 and may include, for example, a display, a hologram device, or a projector, and control circuitry for controlling the display, the hologram device, or the projector. According to an embodiment, the display device 260 may include touch circuitry, or a pressure sensor capable of measuring a pressure of touch.

The audio module 270 may convert sound into an electrical signal or vice versa. According to an embodiment, the audio module 270 may obtain sound through the input device 250 or output sound through the sound output device 255 or an external electronic device connected to the electronic device 201 in a wired or wireless manner (e.g., the electronic device 202 (e.g., a speaker or headphones)).

The sensor module 276 may generate an electrical signal or a data value corresponding to an operating state (e.g., power or temperature) in the electronic device 201, or an external environmental condition. The sensor module 276 may include, for example, a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, or an illumination sensor.

The interface 277 may support a designated protocol capable of establishing connection to an external electronic device (e.g., the electronic device 202) in a wired or wireless manner. According to an embodiment, the interface 277 may include a high-definition multimedia interface (HDMI), a universal serial bus (USB) interface, a secure digital (SD) card interface, or an audio interface.

A connection terminal 278 is a connector capable of physically connecting the electronic device 201 to an external electronic device (e.g., the electronic device 202) and may include, for example, an HDMI connector, a USB connector, an SD card connector, or an audio connector (e.g., a headphone connector).

The haptic module 279 may convert an electrical signal into a mechanical stimulus (e.g., vibration or motion) or electrical stimulus perceivable by the user through tactile or kinesthetic sense. The haptic module 279 may include, for example, a motor, a piezoelectric element, or an electrical stimulator.

The camera module 280 may capture still images and moving images. According to an embodiment, the camera module 280 may include one or more lenses, an image sensor, an image signal processor, or a flash.

The power management module 288 is a module for managing power supplied to the electronic device 201 and may be configured as, for example, at least a part of a power management integrated circuit (PMIC).

The battery 289 is a device for supplying power to at least one element of the electronic device 201 and may include, for example, a primary cell which is not rechargeable, a secondary cell which is rechargeable, or a fuel cell.

The communication module 290 may support establishment of a wired or wireless communication channel between the electronic device 201 and an external electronic device (e.g., the electronic device 202, the electronic device 204, or the server 208) and communication through the established communication channel. The communication module 290 may include one or more communication processors operating independently of the processor 220 (e.g., an application processor) and supporting wired or wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module), and a corresponding communication module may be used to communicate with an external electronic device through the first network 298 (e.g., a short-range communication network such as Bluetooth, Wi-Fi direct, or infrared data association (IrDA)) or the second network 299 (e.g., a long-range communication network such as a cellular network, the Internet, or a computer network (e.g., a LAN or a wide area network (WAN)). The above-described various types of communication modules included in the communication module 290 may be implemented as a single chip or separate chips.

According to an embodiment, the wireless communication module 292 may identify or authenticate the electronic device 201 in a communication network by using user information stored in the subscriber identification module 296.

The antenna module 297 may include one or more antennas for transmitting or receiving signals or power to or from the outside. According to an embodiment, the communication module 290 (e.g., the wireless communication module 292) may transmit or receive signals to or from an external electronic device through an antenna appropriate for a communication scheme.

Some of the above-described elements may be connected to and exchange signals (e.g., commands or data) with each other by using an inter-peripheral communication scheme (e.g., a bus, general-purpose input/output (GPIO), a serial peripheral interface (SPI), or a mobile industry processor interface (MIPI)).

According to an embodiment, the commands or the data may be transmitted or received between the electronic device 201 and the external electronic device 204 via the server 208 connected to the second network 299. Each of the electronic devices 202 and 204 may be of the same type as or a different type from the electronic device 201. According to an embodiment, all or some of operations performed by the electronic device 201 may be performed by one or more other external electronic devices. According to an embodiment, when the electronic device 201 needs to perform a certain function or service automatically or upon a request, the electronic device 201 may transmit a request to perform at least a partial function associated with the function or service, to an external electronic device instead of or in addition to autonomously performing the function or service. The external electronic device having received the request may perform the requested function or an additional function, and transmit a result thereof to the electronic device 201. The electronic device 201 may provide the requested function or service by using the received result with or without additional processing. To this end, for example, cloud computing, distributed computing, or client-server computing technology may be used.

Figure 11:
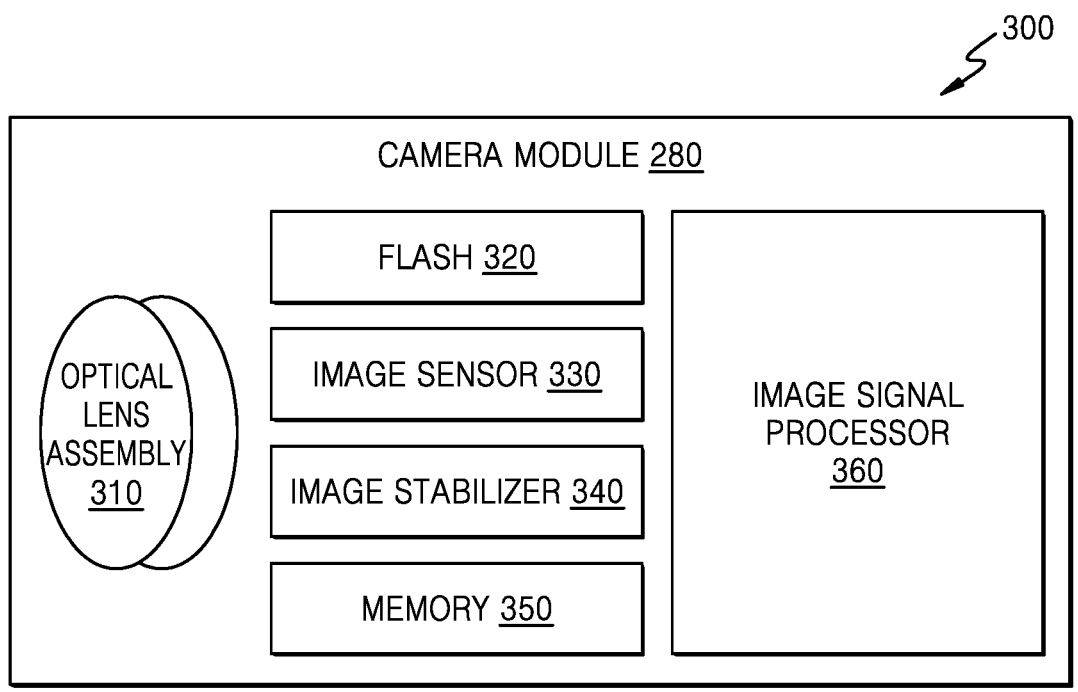
FIG. 11 is a block diagram of a camera module in an electronic device, according to various embodiments.

FIG. 11 is a block diagram 300 of the camera module 280, according to various embodiments. Referring to FIG. 11, the camera module 280 may include an optical lens assembly 310, a flash 320, an image sensor 330, an image stabilizer 340, a memory 350 (e.g., a buffer memory), or an image signal processor 360. The optical lens assembly 310 may collect light emitted from an object, an image of which is to be captured. The optical lens assembly 310 may include one or more lenses. The embodiments described above in relation to FIGS. 1 to 6 may be applied to the optical lens assembly 310. According to an embodiment, the camera module 280 may include a plurality of optical lens assemblies 310. In this case, the camera module 280 may be, for example, a dual camera, a 360° camera, or a spherical camera. The plurality of optical lens assemblies 310 may have the same lens properties (e.g., field of view, focal length, autofocus, f number, or optical zoom), or at least one lens assembly may have at least one different lens property from the other lens assemblies. The optical lens assembly 310 may include, for example, a wide-angle lens or a telephoto lens. The flash 320 may emit light used to enhance the light emitted from the object. The flash 320 may include one or more light-emitting diodes (LEDs) (e.g., a red-green-blue (RGB) LED, a white LED, an IR LED, or an ultraviolet (UV) LED), or a xenon lamp.

The image sensor 330 may obtain an image corresponding to the object, by converting the light transmitted from the object through the optical lens assembly 310, into an electrical signal. According to an embodiment, the image sensor 330 may include a single image sensor selected from among image sensors having different properties (e.g., an RGB sensor, a black and white (BW) sensor, an IR sensor, or a UV sensor), a plurality of image sensors having the same properties, or a plurality of image sensors having different properties. Each image sensor included in the image sensor 330 may be implemented as, for example, a CCD sensor or a CMOS sensor.

In reaction to motion of the camera module 280 or the electronic device 201 including the camera module 280, the image stabilizer 340 may move at least one lens included in the optical lens assembly 310 or the image sensor 330 in a specific direction or give control (e.g., adjust a read-out timing) to at least partially compensate for a negative effect of the motion on a captured image (e.g., image blurring). According to an embodiment, the image stabilizer 340 may be implemented as, for example, an optical image stabilizer, and the motion may be detected using a gyro sensor (not shown) or an acceleration sensor (not shown) provided inside or outside the camera module 280.

The memory 350 may at least temporarily store at least a part of the image obtained by the image sensor 330, for a subsequent image process. For example, when obtaining of an image by a shutter is delayed or when a plurality of images are obtained at high speed, the obtained original image (e.g., a high-resolution image) may be stored in the memory 350 and a copy image thereof (e.g., a low-resolution image) may be pre-viewed on the display device 260. Thereafter, when a designated condition is satisfied (e.g., when a user input or a system command is received), at least a part of the original image stored in the memory 350 may be obtained and processed by, for example, the image signal processor 360. According to an embodiment, the memory 350 may be configured as at least a part of the memory 230 or as a separate memory operating independently of the memory 230.

The image signal processor 360 may perform an image process (e.g., depth mapping, 3D modeling, panoramic image creation, feature point extraction, image synthesis, or image compensation (e.g., noise cancellation, resolution adjustment, brightness control, blurring, sharpening, or softening)) on the image obtained by the image sensor 330 or stored in the memory 350. Additionally or alternatively, the image signal processor 360 may give control (e.g., exposure time control or read-out timing control) to at least one of the elements included in the camera module 280 (e.g., the image sensor 330). The image processed by the image signal processor 360 may be stored in the memory 350 again for an additional process, or be transmitted to an element outside the camera module 280 (e.g., the memory 230, the display device 260, the electronic device 202, the electronic device 204, or the server 208). According to an embodiment, the image signal processor 360 may be configured as at least a part of the processor 220 or as a separate processor operating independently of the processor 220. When configured as a separate processor, images processed by the image signal processor 360 may be displayed on the display device 260 by the processor 220 with or without additional image processing.

According to an embodiment, the electronic device 201 may include two or more camera modules 280 having different properties or functions. In this case, for example, at least one camera module 280 may be a wide-angle camera or a front camera, and at least another camera module may be a telephoto camera or a rear camera.

An optical lens assembly according to various embodiments may include a first lens, a second lens, a third lens, a fourth lens, a fifth lens, a sixth lens, and a seventh lens arranged from an object side to an image side, the first lens may have a negative refractive power, an object side surface or an image side surface of the seventh lens may include an aspherical shape that is convex toward the object side in a region near an optical axis and is concave toward the object side in a peripheral region, and the following inequalities may be satisfied.

<Inequalities>

$$120° \leq Fov \leq 200°$$

$$2.5 \leq TL/ImgH \leq 5$$

where Fov denotes a field of view of the optical lens assembly, TL denotes a distance from an object side surface of the first lens to an image plane on which an image is formed by the optical lens assembly, and ImgH denotes an image height.

Five or more of the first to seventh lenses may be configured as plastic aspherical lenses.

The optical lens assembly may satisfy the following inequality.

<Inequality>

$$1 \leq f_7/f \leq 10$$

where $f_7$ denotes a focal length of the seventh lens, and f denotes a total focal length of the optical lens assembly.

The optical lens assembly may satisfy the following inequality.

<Inequality>

$$1.4 \leq N_1 \leq 1.8$$

where $N_1$ denotes a refractive index of the first lens.

The first lens may have a convex object side surface and a concave image side surface.

The second lens may have a convex object side surface and a concave image side surface.

The second lens may have a negative refractive power, the third lens may have a positive refractive power, the fourth lens may have a positive refractive power, the fifth lens may have a positive refractive power, the sixth lens may have a negative refractive power, and the seventh lens may have a positive refractive power.

The optical lens assembly may further include a diaphragm provided between the third lens and the fourth lens.

The fourth lens may be a biconvex lens.

The sixth lens may have a concave object side surface and a convex image side surface.

The optical lens assembly may satisfy the following inequality.

<Inequality>

$$25 \leq V_5 - V_6 \leq 40$$

where $V_5$ denotes an Abbe number of the fifth lens, and $V_6$ denotes an Abbe number of the sixth lens.

An optical lens assembly according to various embodiments may include a first lens, a second lens, a third lens, a fourth lens, a fifth lens, a sixth lens, and a seventh lens arranged from an object side to an image side, the first lens may have a negative refractive power and has a flat object side surface, an object side surface or an image side surface of the seventh lens may include an aspherical shape that is convex toward the object side in a region near an optical axis and is concave toward the object side in a peripheral region, and the following inequality may be satisfied.

<Inequality>

$$120° \leq Fov \leq 200°$$

where Fov denotes a field of view of the optical lens assembly.

The optical lens assembly may satisfy the following inequality.

<Inequality>

$$2.5 \leq TL/ImgH \leq 5$$

where TL denotes a distance from the object side surface of the first lens to an image plane on which an image is formed by the optical lens assembly, and ImgH denotes an image height.

The second to seventh lenses may be configured as plastic aspherical lens.

An electronic device according to various embodiments may include at least one optical lens assembly, and at least one image sensor for receiving an image formed by the at least one optical lens assembly, the at least one optical lens assembly may include a first lens, a second lens, a third lens, a fourth lens, a fifth lens, a sixth lens, and a seventh lens arranged from an object side to an image side, the first lens may have a negative refractive power, an object side surface or an image side surface of the seventh lens may include an aspherical shape that is convex toward the object side in a region near an optical axis and is concave toward the object side in a peripheral region, and the following inequalities may be satisfied.

<Inequalities>

$$120° \leq Fov \leq 200°$$

$$2.5 \leq TL/ImgH \leq 5$$

where Fov denotes a field of view of the optical lens assembly, TL denotes a distance from an object side surface of the first lens to an image plane on which an image is formed by the optical lens assembly, and ImgH denotes an image height.

The at least one optical lens assembly may include a first optical lens assembly and a second optical lens assembly, and the first optical lens assembly and the second optical lens assembly may be arranged in a line.

The at least one optical lens assembly may include a first optical lens assembly and a second optical lens assembly, and the first optical lens assembly and the second optical lens assembly may be arranged in parallel.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An optical lens assembly comprising:
a first lens, a second lens, a third lens, a fourth lens, a fifth lens, a sixth lens, and a seventh lens arranged from an object side to an image side,
wherein the first lens has a negative refractive power,
wherein an object side surface or an image side surface of the seventh lens comprises an aspherical shape that is convex toward the object side in a region near an optical axis and is concave toward the object side in a peripheral region, and
wherein the following inequalities are satisfied
<Inequalities>

$$120° \leq Fov \leq 200°$$

$$2.5 \leq TL/\text{ImgH} \leq 5$$

where Fov denotes a field of view of the optical lens assembly, TL denotes a distance from an object side surface of the first lens to an image plane on which an image is formed by the optical lens assembly, and ImgH denotes an image height,
wherein the second lens has a negative refractive power, the third lens has a positive refractive power, the fourth lens has a positive refractive power, the fifth lens has a positive refractive power, the sixth lens has a negative refractive power, and the seventh lens has a positive refractive power, and
wherein the sixth lens is a meniscus lens and includes a concave object side surface.

2. The optical lens assembly of claim 1, wherein five or more of the first to seventh lenses are configured as plastic aspherical lenses.

3. The optical lens assembly of claim 1, wherein the following inequality is satisfied
<Inequality>

$$1 \leq f_7/f \leq 10$$

where $f_7$ denotes a focal length of the seventh lens, and f denotes a total focal length of the optical lens assembly.

4. The optical lens assembly of claim 1, wherein the following inequality is satisfied
<Inequality>

$$1.4 \leq N_1 \leq 1.8$$

where $N_1$ denotes a refractive index of the first lens.

5. The optical lens assembly of claim 1, wherein the first lens has a convex object side surface and a concave image side surface.

6. The optical lens assembly of claim 1, wherein the second lens has a convex object side surface and a concave image side surface.

7. The optical lens assembly of claim 1, wherein the following inequality is satisfied
<Inequality>

$$25 \leq V_5 - V_6 \leq 40$$

where $V_5$ denotes an Abbe number of the fifth lens, and $V_6$ denotes an Abbe number of the sixth lens.

8. An electronic device comprising:
at least one optical lens assembly; and
at least one image sensor for receiving an image formed by the at least one optical lens assembly,
wherein the at least one optical lens assembly comprises a first lens, a second lens, a third lens, a fourth lens, a fifth lens, a sixth lens, and a seventh lens arranged from an object side to an image side, the first lens has a negative refractive power, an object side surface or an image side surface of the seventh lens comprises an aspherical shape that is convex toward the object side in a region near an optical axis and is concave toward the object side in a peripheral region, and the following inequalities are satisfied
<Inequalities>

$$120° \leq Fov \leq 200°$$

$$2.5 \leq TL/\text{ImgH} \leq 5$$

where Fov denotes a field of view of the optical lens assembly, TL denotes a distance from an object side surface of the first lens to an image plane on which an image is formed by the optical lens assembly, and ImgH denotes an image height,
wherein the second lens has a negative refractive power, the third lens has a positive refractive power, the fourth lens has a positive refractive power, the fifth lens has a positive refractive power, the sixth lens has a negative refractive power, and the seventh lens has a positive refractive power, and
wherein the sixth lens is a meniscus lens and includes a concave object side surface.

9. The electronic device of claim 8, wherein the at least one optical lens assembly comprises a first optical lens assembly and a second optical lens assembly, and the first optical lens assembly and the second optical lens assembly are arranged in a line or in parallel.

* * * * *